US007402291B2

(12) United States Patent
Fine et al.

(10) Patent No.: US 7,402,291 B2
(45) **Date of Patent: *Jul. 22, 2008**

(54) DISPENSING APPARATUS AND METHOD SUITABLE FOR HETEROGENEOUS COMPOSITION

(75) Inventors: David A. Fine, Minneapolis, MN (US); Terry James Klos, Victoria, MN (US); Brian Chute, Inver Grove Heights, MN (US); Brandon Carlson, Apple Valley, MN (US); Quang Dao, Eden Prairie, MN (US)

(73) Assignee: Ecolab Inc., St. Paul, MN (US)

(*) Notice: Subject to any disclaimer, the term of this patent is extended or adjusted under 35 U.S.C. 154(b) by 789 days.

This patent is subject to a terminal disclaimer.

(21) Appl. No.: 10/826,895

(22) Filed: Apr. 16, 2004

(65) Prior Publication Data

US 2004/0253155 A1 Dec. 16, 2004

Related U.S. Application Data

(63) Continuation-in-part of application No. 10/435,351, filed on May 9, 2003.

(60) Provisional application No. 60/467,661, filed on May 2, 2003.

(51) Int. Cl.
*B01D 11/02* (2006.01)
*B67D 5/00* (2006.01)

(52) U.S. Cl. .......................... 422/256; 422/261; 222/82

(58) Field of Classification Search ................. 422/256, 422/261; 222/82

See application file for complete search history.

(56) References Cited

U.S. PATENT DOCUMENTS

| | | | |
|---|---|---|---|
| 3,727,889 | A | 4/1973 | Nagel |
| 4,830,509 | A | 5/1989 | Gulmatico, Jr. |
| 4,889,644 | A | 12/1989 | Amberg et al. |
| 5,342,587 | A | 8/1994 | Laughlin et al. |
| 5,435,157 | A | 7/1995 | Laughlin |
| 5,478,537 | A | 12/1995 | Laughlin et al. |
| 5,549,875 | A | 8/1996 | Laughlin et al. |
| 5,846,499 | A | 12/1998 | Laughlin et al. |
| 5,865,343 | A | 2/1999 | Busch et al. |
| 6,098,646 | A | 8/2000 | Hennemann et al. |
| 6,240,953 | B1 | 6/2001 | Laughlin et al. |

FOREIGN PATENT DOCUMENTS

| | | |
|---|---|---|
| EP | 0 774 292 A2 | 5/1997 |
| EP | 0 864 684 A1 | 9/1998 |
| WO | WO 98/59222 | 12/1998 |

*Primary Examiner*—Elizabeth L McKane
(74) *Attorney, Agent, or Firm*—Merchant & Gould P.C.

(57) ABSTRACT

The present invention relates to an apparatus and method suitable for dispensing heterogeneous compositions.

18 Claims, 14 Drawing Sheets

DISPENSING APPARATUS AND METHOD SUITABLE FOR HETEROGENEOUS COMPOSITION

CROSS REFERENCE TO RELATED APPLICATIONS

This application is a continuation in part of U.S. patent application Ser. No. 10/435,351, filed May 9, 2003, and entitled DISPENSING APPARATUS AND METHOD SUITABLE FOR HETEROGENEOUS COMPOSITION, which claims priority under 35 U.S.C. §119(e) to U.S. Provisional Application entitled "DISPENSING APPARATUS AND METHOD SUITABLE FOR HETEROGENEOUS COMPOSITION", Ser. No. 60/467,661, filed on May 2, 2003, each of which is incorporated by reference herein.

FIELD OF THE INVENTION

The present invention relates to an apparatus and method suitable for dispensing heterogeneous compositions.

BACKGROUND OF THE INVENTION

Existing methods and apparatus can adequately dispense homogeneous compositions, such as homogeneous cleaning compositions. Even with existing technology, dispensing liquids or powders can be messy, exposing persons to the composition. Dispensing solids can be difficult and expensive. Improved methods and apparatus are needed to dispense heterogeneous compositions, particularly heterogeneous compositions including at least one component that flows.

Existing cleaning compositions require formulations that keep the composition homogeneous and/or stable. Homogeneous liquid and solid compositions include a significant amount of materials that keep them homogeneous and stable. There remains a need for a product that can be employed in a heterogeneous form, that can include an increased proportion of active ingredients (rather than ingredients that keep the composition homogeneous and stable), and that can form a homogeneous concentrate and/or use composition.

SUMMARY OF THE INVENTION

The present invention relates to an apparatus and method suitable for dispensing heterogeneous compositions.

The present apparatus includes breach system, dilution system, and distribution system. The breach system can be configured to open a container and release composition from the container and into the dilution system. The dilution system can be configured to receive the composition and to mix the composition with liquid. In an embodiment, the dilution system can also be configured to rinse residual composition from the container. The distribution system can be configured to transport the mixture of composition and liquid from the apparatus. In an embodiment, the mixture is homogeneous.

The present method includes piercing a covering on an opening of a container and rinsing the container, thereby transferring the contents of the container into a dilution system, combining the contents with a fluid to produce an intermediate composition, and dispensing the intermediate composition to a washing machine.

DETAILED DESCRIPTION OF THE INVENTION

Definitions

Figure 1A:
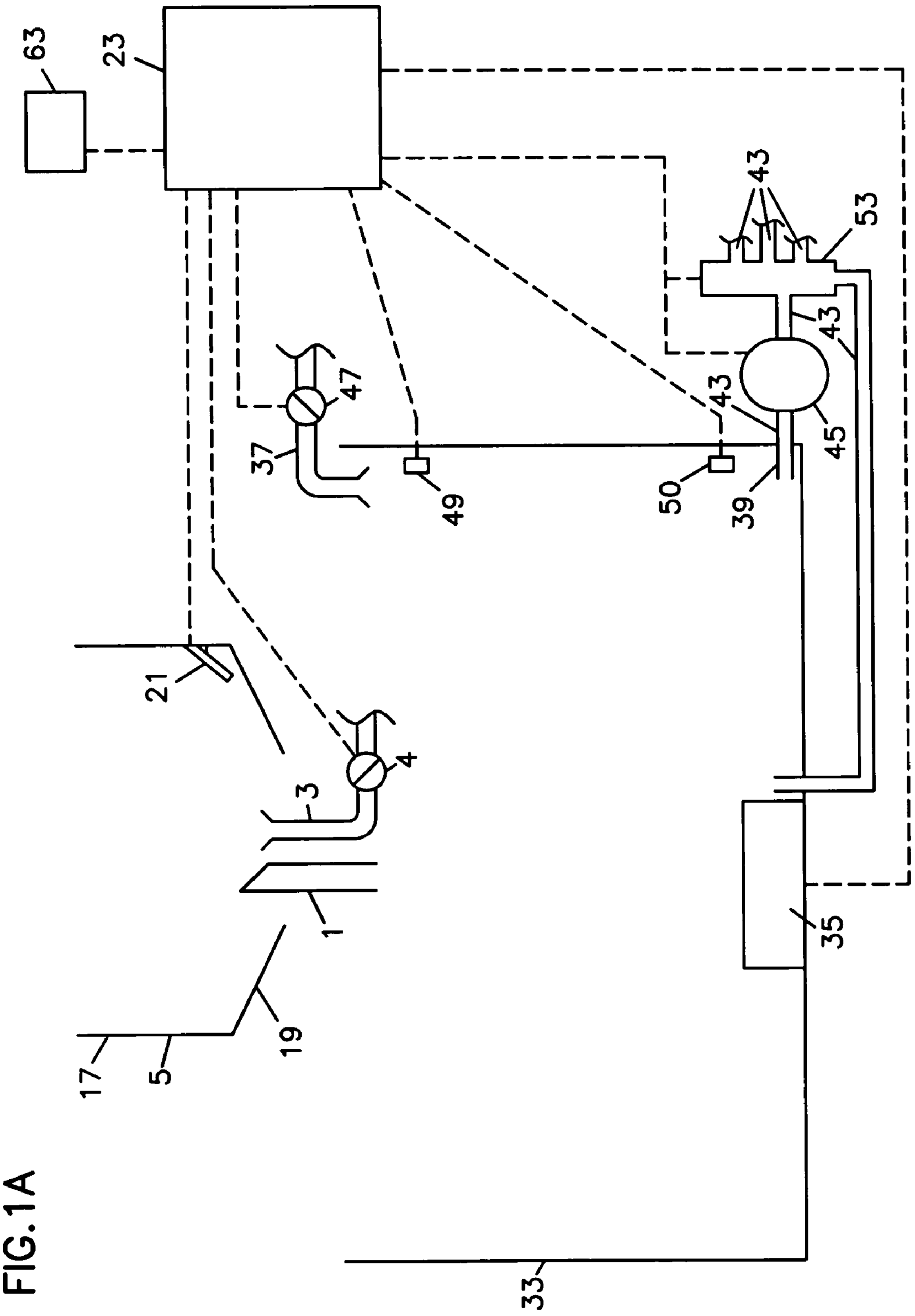
FIGS. 1A and 1B schematically illustrate embodiments of the present apparatus.

As used herein, the term "heterogeneous" refers to a cleaning composition that is not uniform in its macroscopic properties (non-isotropic). For example, a heterogeneous cleaning composition can include mixed ingredients or dissimilar or diverse ingredients or constituents. The present heterogeneous cleaning composition includes two or more substances that need not be evenly dispersed.

Apparatus and Dispensing Method

The present invention includes an apparatus and method for dispensing compositions from a container. The present apparatus and method can dispense compositions that at least partially leave (e.g., pour or flow from) the opened and inverted container under the force of gravity. Such compositions can include liquid, powder, gel or semi-solid, or flowable solids. The composition can also include components that are, for example, gelled or semi-solid, and that, under the influence of gravity, remain in the container for a longer than a desired time. The method and apparatus employ rinsing the container to remove such components. In an embodiment, the compositions are cleaning compositions, e.g., heterogeneous cleaning compositions.

In an embodiment, according to the present method and employing the present apparatus, the composition can be emptied and rinsed from the container in less than about 30 min, in less than about 20 min, in less than about 15 min, or in less than about 10 min. In an embodiment, according to the present method and employing the present apparatus, the composition can be emptied and rinsed from the container using less than about 20 container volumes of fluid, using less than about 15 container volumes of fluid, or using less than about 10 (e.g., 9) container volumes of fluid.

In an embodiment, the apparatus and method breach the container, and gravity draws at least a portion of the contents of the container into a dilution system. The apparatus and method rinse remaining composition from the container, and the rinse flows into the dilution system. The dilution system dilutes and mixes the composition. In an embodiment, the mixed composition is homogeneous. The apparatus and method distribute the diluted and mixed composition for use. For example, the diluted and mixed composition can be pumped to one or more cleaning apparatus, such as a ware washing machine, vehicle wash arch, processing equipment washer, or laundry washing machine.

Apparatus

The present dispensing apparatus includes a breach system, a dilution system, and a distribution system. The breach system is configured to open a container, releasing the contents of the container into the dilution system. The dilution system is configured to receive the composition, and to mix the composition with a fluid, e.g., water. The distribution system is configured to transport the diluted composition to the site of use.

Breach System

The breach system is configured to open a container, releasing the contents of the container into the dilution system. The container can be a rigid container. In an embodiment, the container is flexible and has a cap or collar defining a portion of the container to be opened. The breach system can include a piercing system configured to break a seal across the opening of a container. Such a piercing system can include a rigid pointed member that can, for example, poke a hole in and push aside a flexible plastic or metal (e.g., foil) member sealed across the opening of a bottle or capsule. In an embodiment, the container cap or seal includes a perforation demarking a portion of the cap or seal that is pushed aside by, for example, the piercing system.

The breach system can also include a rinsing system configured to contact the container and composition remaining in the container with a fluid (e.g., water) and remove additional composition from the container. The rinsing system can rinse composition from the container. The rinsing system can include, for example, a tube directed into the opening of the container from which fluid can flow into the container. In an embodiment, the rinsing system includes a spray head configured to direct water at the interior sides and end of the container. The rinsing system can employ water from and at the pressure of a controllably valved connection to service water, such as soft water or tap water. Service water can include hot water, cold water, or a mixture (e.g., a temperature controlled mixture) thereof. The rinsing system can employ fluid recirculated from the tank.

In an embodiment, the rinsing system is configured to rinse remaining composition from the container and into the tank in less than about 30 min, in less than about 20 min, in less than about 15 min, or in less than about 10 min. These times can be measured from when the container is first breached. In an embodiment, the rinsing system is configured to rinse remaining composition from the container and into the tank employing less than about the volume of the tank. In an embodiment, the rinsing system is configured to rinse remaining composition from the container and into the tank employing less than about 20 container volumes of fluid, employing less than about 15 container volumes of fluid, or employing less than about 10 container volumes of fluid. In an embodiment, the rinsing system is configured to provide a predetermined level or volume of water to the tank.

In an embodiment, the rinsing system determines the amount of fluid to add to the apparatus based on the level of fluid in the tank when rinsing is started. The rinsing system can add fluid and/or recirculate fluid from the tank. The rinsing system can determine the amount of fluid to add and/or the amount of fluid in the tank through a combination of sensor activation and elapsed activation time of either the distribution system and/or the rate of fluid addition.

The breach system can also include a docking system configured to receive and retain the container of the composition. For example, the docking system can include a member having a shape complementary to the shape of the container, that can receive the container, and that can position the opening of the container in contact with the piercing system. In an embodiment, once in contact with the piercing system, gravity and/or the operator urge the piercing system through the seal on the opening of the container. The docking system can include a stop that, after the piercing system has breached the seal, retains the container at a position with at least a portion of the piercing system and of the rinsing system in the container. Typically, the piercing and/or rinsing system protrude into the container to about 50% the length of the container or to about 25% the length of the container. For example, a piercing system can protrude about 2 inches into an 8 inch container.

In an embodiment, the docking system includes a mating system that reversibly mates the container with the breach system. For example, the mating system can be configured so that once the container is inserted into the docking system, a twist of the container will reversibly lock the container to the mating system. In an embodiment, a motion locks the container into the breach system and induces the breach system to breach the container seal.

In an embodiment, the breach system also includes a container sensor. The container sensor is configured to indicate the presence of a composition container in or contacting the breach system. Preferably, the container sensor indicates that the composition container is positioned for receiving fluid from the rinsing system.

In an embodiment, the breach system is located over the dilution system. In such an embodiment, the piercing system can be generally vertically directed to open a generally downward directed container. The rinsing system can also be generally vertically directed to inject water generally upwardly into the container. In such an embodiment, composition and rinse can flow or pour from the container, past or over the piercing system and/or rinsing system, and into the dilution system.

Rinsing and Unsealing System

In an embodiment, the breach system includes a rinsing and unsealing system that is configured to open and rinse the container. For example, the product container can be sealed with a membrane that will dissolve or otherwise fragment when sprayed with water. A breach system for such as container can include a rinse system that directs water first at the dissolvable membrane, then at the interior sides and end of the container. The rinsing and unsealing system rinses product from the container, but need not protrude into the container.

Twist Opening System

In an embodiment, the breach system includes a twist opening system that is configured to open and rinse the container. The breach system can include a mating system that with rotation of the container reversibly mates the container with the breach system. For example, the mating system can be configured so that once the container is inserted into the docking system, a twist of the container will reversibly lock the container to the mating system. In an embodiment, a motion locks the container into the breach system and moves a container cover to at least partially open the container.

For example, twisting the container can move an inner cover relative to an outer cover. In such an embodiment, each cover can define an aperture. When the container is closed, the outer cover aperture is arranged over a solid portion of the inner cover. When the container is opened, the outer cover aperture is moved into alignment with the inner cover aperture. The aligned apertures open the inside of the container to the outside environment. In such an embodiment, the rinse system can then rinse the container, for example, either by spraying through the aligned apertures into the container or by moving into the container through the aligned apertures.

Rotational Slicing System

In an embodiment, the breach system includes a rotational slicing system that is configured to open and rinse the container. The breach system can include a mating system that with rotation of the container reversibly couples the container to the breach system. For example, the mating system can be configured so that once the container is inserted into the docking system, rotating the container will reversibly couple the container to the mating system. In an embodiment, rotating the container also slices a seal that covers an opening of the container.

For example, the container can include a collared, round opening covered by a seal. The rotational cutting system can include a blade. The blade can be configured to contact and pierce the seal as the container is coupled to the mating system. Rotating the container about an axis can move the blade in a circular path through the seal, thus producing a circular opening in the seal. Rotation through less than 360° (e.g., 270°) will leave the cut away portion of the seal coupled to the remainder of the seal and the container. The rotational cutting system can be configured to allow rotation of the container through less than 360° (e.g., 270°).

After cutting of the seal, the rinsing system can rinse the container. In such an embodiment, the rinse system can rinse the container, for example, either by spraying through the opening in the cut seal or by moving into the container through the cut seal.

Dilution System

The dilution system is configured to receive the composition, and to mix the composition with a liquid, e.g., water. The dilution system can include a tank and a mixing system. The tank is configured to receive composition and rinse from the container and breach system. In an embodiment, the tank can be positioned under the breach system. The tank has a volume sufficient to contain the composition, rinse fluid, and, optionally, additional fluid used, suitable, or necessary to produce an intermediate composition. In an embodiment, the intermediate composition is homogeneous.

The mixing system is configured to combine the composition and rinse in the tank to produce the intermediate composition. The mixing system can include conventional apparatus for combining or blending fluids or dissolving a solid in a fluid, such as paddle, stirrer, blade, impeller, recirculating pump, jet, and the like. In an embodiment, the mixing system is configured, in conjunction with the rinsing system, to mix the composition and rinse to produce the intermediate composition in less than about 30 min, in less than about 20 min, in less than about 15 min, or in less than about 10 min after the container is first breached. The intermediate composition, once mixed, remains stable (e.g., does not separate, gel, or precipitate) until use, typically 0.5 to 36 hours, or, in an embodiment, for as long as 14 days.

The dilution system can optionally include an addition system. The addition system can be configured to provide diluting fluid to the dilution system. For example, the addition system can include a controllably valved connection to service water, such as soft water or tap water. Service water can include hot water, cold water, or a mixture (e.g., a temperature controlled mixture) thereof. The addition system can be configured to provide water to the tank before breaching a container, while a container is being breached and rinsed, after the container has been breached and rinsed, or a combination thereof. In an embodiment, the addition system is configured to provide a predetermined level or volume of water to the tank.

The dilution system can also include a diluent sensor. The diluent sensor is configured to indicate when the level of fluid in the tank reaches a predetermined limit. The diluent sensor can be configured to indicate (e.g., by audible alarm and/or indicator light) when the volume of fluid in the tank reaches a predetermined amount. The diluent sensor can signal the rinsing system to stop rinsing.

Distribution System

The distribution system is configured to transport the diluted composition to the site of use. The distribution system can include a fluid moving system, one or more fluid conducting systems, a fluid distributing system, a controller, and, optionally, a cleaning apparatus interface system. The fluid moving system is configured to move fluid through the fluid conducting system and fluid distributing system at times and in amounts indicated by the controller. The fluid conducting system is configured to provide fluid communication. The fluid distributing system is configured to direct fluid to the one or more fluid conducting systems at times and in amounts indicated by the controller. The controller is configured to direct the fluid moving system and/or fluid distributing system to move fluid at a particular rate or flow, in a particular direction or through a particular fluid conducting system, for or at a particular time period.

In an embodiment, the distribution system is configured to transport the intermediate composition from the dilution system to the point of use. For example, the distribution system can transport the intermediate composition from the present apparatus to one, two, or three washing machines or other cleaning apparatus. The cleaning apparatus interface system is configured to transmit request signals from the cleaning apparatus to the controller. For example, the cleaning apparatus can request that the controller command the distribution system to start, continue, and/or stop pumping composition from the dispensing apparatus to the cleaning apparatus.

In an embodiment, the distribution system is also configured to provide a component of the mixing system. In such an embodiment, the distribution system can circulate fluid within the tank to achieve mixing and the intermediate composition.

In an embodiment, the distribution system is configured to detect that the level of intermediate composition in the tank has reached a low level. The distribution system can be configured to signal that the level is low, that the operator should add more cleaning composition to the apparatus, and/or to stop the apparatus from further dispensing to a washing machine.

In an embodiment, the present apparatus can be configured to provide an advantageously small footprint. For example, the bulk of the breach system can be above the bulk of the dilution system, which can be above the bulk of the distribution system.

Method

The present dispensing method includes piercing a covering on an opening of a container and rinsing the container, thereby transferring the contents of the container into a dilution system, combining the contents with a fluid to produce an intermediate composition, and dispensing the intermediate composition to a washing machine. The method of the invention can be carried out using the apparatus of the invention.

Piercing, Rinsing, and Transferring

The present dispensing method includes piercing a covering on an opening of a container and rinsing the container, thereby transferring the contents of the container into a dilution system. Piercing can be conducted with the apparatus of the present invention, for example, employing the breach system.

In an embodiment, piercing includes piercing a seal across the opening of a rigid container. For example, piercing can include poking a hole in and pushing aside a flexible plastic or metal (e.g., foil) member sealed across the opening of a bottle or capsule. In an embodiment, piercing can include positioning the opening of the container in contact with the piercing system and urging the piercing system through the seal on the opening of the container. After piercing, the method can include retaining the container at a position with at least a portion of the piercing system and of the rinsing system in the container.

In an embodiment, rinsing includes contacting the container and any composition remaining in the container with a fluid (e.g., water) and removing the composition from the container. Rinsing can include separating the container and composition, for example, spraying water on the sides and end of the container. Rinsing can include recirculating fluid from the tank.

In an embodiment, piercing and rinsing can include sensing the presence of a composition container in or contacting the breach system. Preferably, the sensing includes indicating the composition container is positioned for receiving fluid from the rinsing system followed by rinsing.

In the present method, piercing and rinsing are sufficient to effect transfer of the composition and the rinse to the dilution system. Piercing the container can result in composition, for example, flowing or falling into the dilution system. Typically, gravity is the driving force. Similarly, rinsing the container results in the rinse, for example, flowing or falling into the dilution system. Typically, gravity is the driving force. The composition and/or the rinse can flow or fall directly into the dilution system. Alternatively, the composition and/or the rinse can flow or fall on a transfer member and then into the dilution system. In an embodiment, with or without a transfer member, gravity is sufficient force to transfer the composition and rinse to the dilution system without application of mechanical force.

Combining

The present dispensing method includes combining the contents with a fluid to produce an intermediate composition. Combining can be conducted with the apparatus of the present invention, for example, employing the dilution system.

In an embodiment, combining includes receiving the composition and mixing the composition with the rinse fluid, e.g., water. Combining can occur in, for example, a tank positioned under the apparatus that effects piercing. In an embodiment, combining includes mixing for less than about 20 min, for less than about 15 min, or for less than about 10 min after piercing occurs. Combining, preferably, produces a homogeneous intermediate composition.

In an embodiment, combining includes sensing a level of fluid. For example, sensing can include indicating when the level of fluid in the tank reaches a predetermined limit. Sensing can include signaling the rinsing system to stop rinsing.

In an embodiment, the amount of rinse fluid added is determined in response to the level of the intermediate composition in the tank at the start of the combining cycle. The liquid volume at the start and end of the combining cycle can be determined through a combination of sensor activation and elapsed activation time of either the distribution system or the water control valve Dispensing The present method includes dispensing the intermediate composition to a washing machine. Dispensing can be conducted with the apparatus of the present invention, for example, employing the distributing system. In an embodiment, dispensing can transport the intermediate composition to one, two, or three washing machines.

In an embodiment, dispensing includes pumping the intermediate composition through one or more selected conduits. Selecting the fluid conducting system can employ a fluid distributing system, for example a system of valves and conduits. Selecting and/or pumping can be accomplished in response to request signals from a cleaning apparatus transmitted by a cleaning apparatus interface module. Selecting and/or pumping can be accomplished in response to commands from a controller. For example, pumping can move fluid through the fluid conducting system and/or fluid distributing system at times and in amounts indicated by the controller.

ILLUSTRATED EMBODIMENTS

FIG. 1 schematically illustrates an embodiment of the present apparatus including a breach system, a dilution system, and a distribution system. FIG. 1 illustrates the breach system over the dilution system. In this embodiment, the breach system includes a spike 1, a spout 3, and a receptacle 5.

Spike 1 is configured to open a container, for example, by breaking a seal covering the opening of a rigid container, such as ajar or capsule. In an embodiment, spike 1 can be configured to break a seal and push it away from the opening of the jar or capsule. Contoured spike 7 is configured to break a seal, push the broken seal into the interior of a capsule, and maintain a portion of the seal attached to the capsule.

Figure 2:
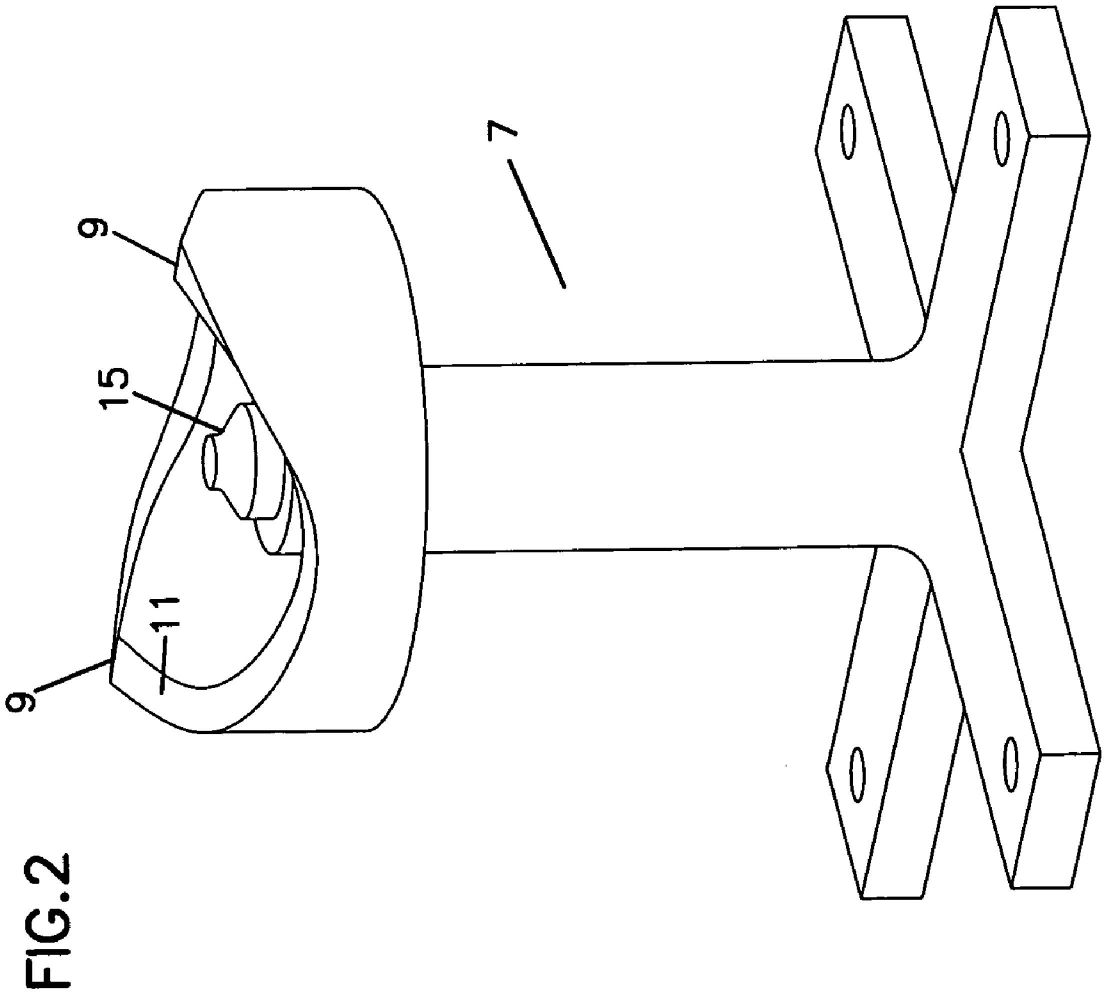
FIG. 2 schematically illustrates an embodiment of a contoured spike according to the present invention.

FIG. 2 schematically illustrates an embodiment of contoured spike 7. Contoured spike 7 is dimensioned to occupy half or more (e.g., about 85%) of the cross sectional area of the opening of the container. For example, a contoured spike 7 suitable for a container with a 70 mm opening can span a diameter of about 60 mm. Contoured spike includes one or more of point 9 and beveled surface 11. Point 9 is configured to contact and break the container seal. Beveled surface 11 is configured to move the seal to a position in which it does not block the opening of the container. Contoured spike 7 is configured to break a seal, push the broken seal into the interior of a capsule, and maintain a portion of the seal attached to the capsule.

Figure 3:
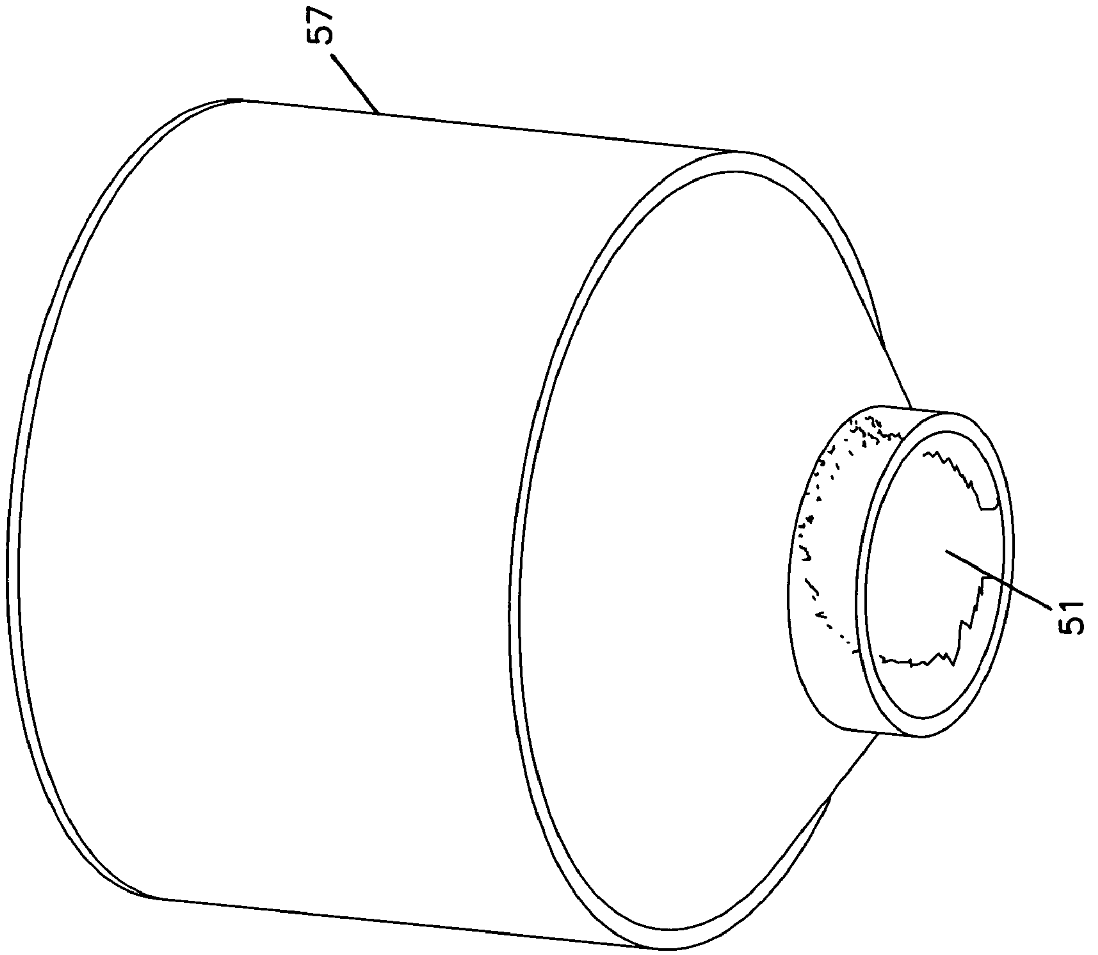
FIG. 3 schematically illustrates an embodiment of a container on which the seal has been broken and pushed into the interior of the container while remaining attached in part to the container.

FIG. 3 schematically illustrates a container 57 on which the container seal 51 has been broken and pushed into the interior of the capsule while remaining attached in part to the container. Container 57 on which the container seal 51 has been broken and pushed into the interior of the capsule while remaining attached in part to the container can be envisioned as resembling a wide mouth aspirin or vitamin bottle on which a person has used their thumb to push the seal into the bottle.

Figure 5A:
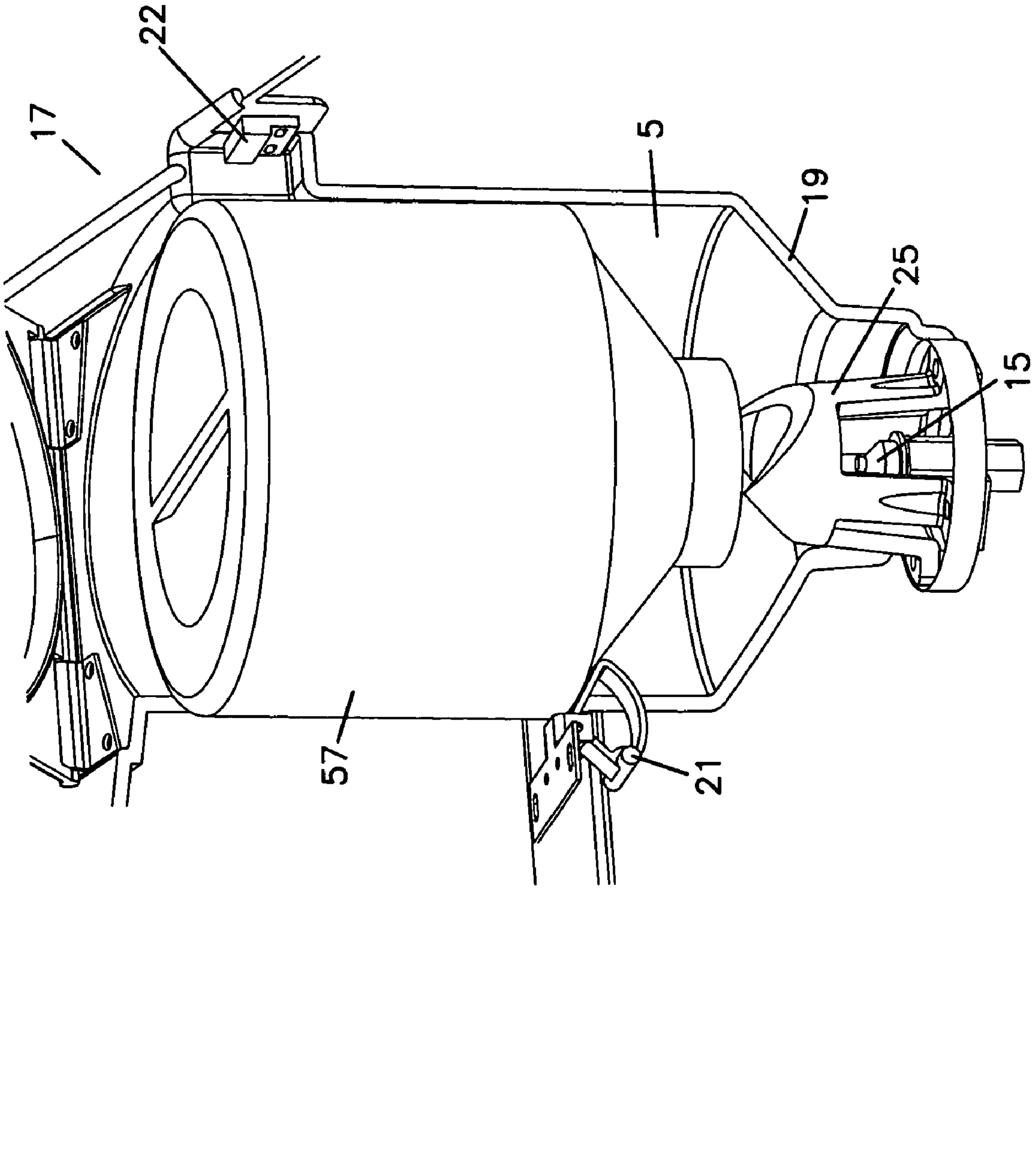
FIGS. 5A and 5B schematically illustrate an embodiment of a breach system according to the present invention and including a rinsing and unsealing system.

Returning to FIG. 1, spout 3 is configured to provide liquid (e.g., water) to contact the interior of the container and to rinse a major portion of the interior. The system is typically configured for use with containers of compositions from which at least a portion of the contents drops, pours, or flows under the influence of gravity, but a portion of composition remains in the container. The system can also be used with contents that remain in the container until rinsed out. Spout 3 is configured to rinse from the container all or nearly all of the composition remaining in the container. Spout 3 can include a nozzle 15, which can spray (FIGS. 1 and 5A).

Spout 3 can be nested in spike 1, when spike 1 is in the form of hollow contoured spike 25. Hollow contoured spike 25 is configured to break a seal, push the broken seal into the interior of a capsule, and maintain a portion of the seal attached to the capsule.

Figure 4A:
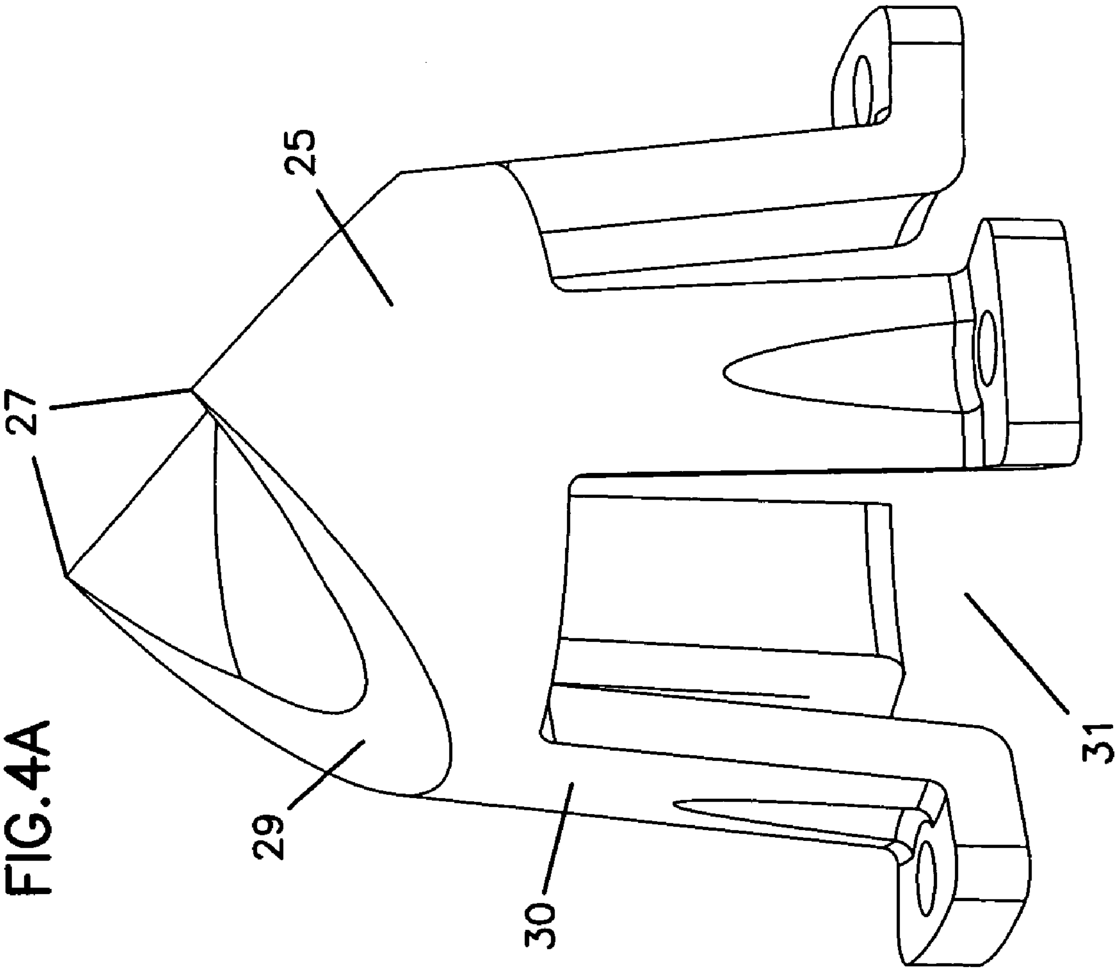
FIGS. 4A and 4B schematically illustrate embodiments of the hollow contoured spike of the present invention.

FIG. 4A schematically illustrates an embodiment of hollow contoured spike 25. Hollow contoured spike 25 is dimensioned to occupy half or more (e.g., about 70 or 85%) of the cross sectional area of the opening of the container. For example, a hollow contoured spike 25 suitable for a container with a 70 mm opening can have a diameter of about 60 mm. Hollow contoured spike 25 includes one or more (e.g., two) of hollow point 27, one or more of beveled edge 29, and one or more (e.g., 4) of spike leg 30, and defines cavity 31. Hollow point 27 is configured to contact and break the container seal. In an embodiment, a plurality of hollow points 27 can be asymmetrically arranged on hollow contoured spike 25. In an embodiment, a plurality of hollow points 27 can be an odd number of hollow points 27. In an embodiment, the odd number of hollow points 27 can be asymmetrically arranged on hollow contoured spike 25. Beveled edge 29 is configured to move the seal to a position in which it does not block the opening of the container. Cavity 31 in hollow contoured spike 25 can be configured to allow composition (including particles) to pass through and/or to house spout 3 or nozzle 15.

Figure 4B:
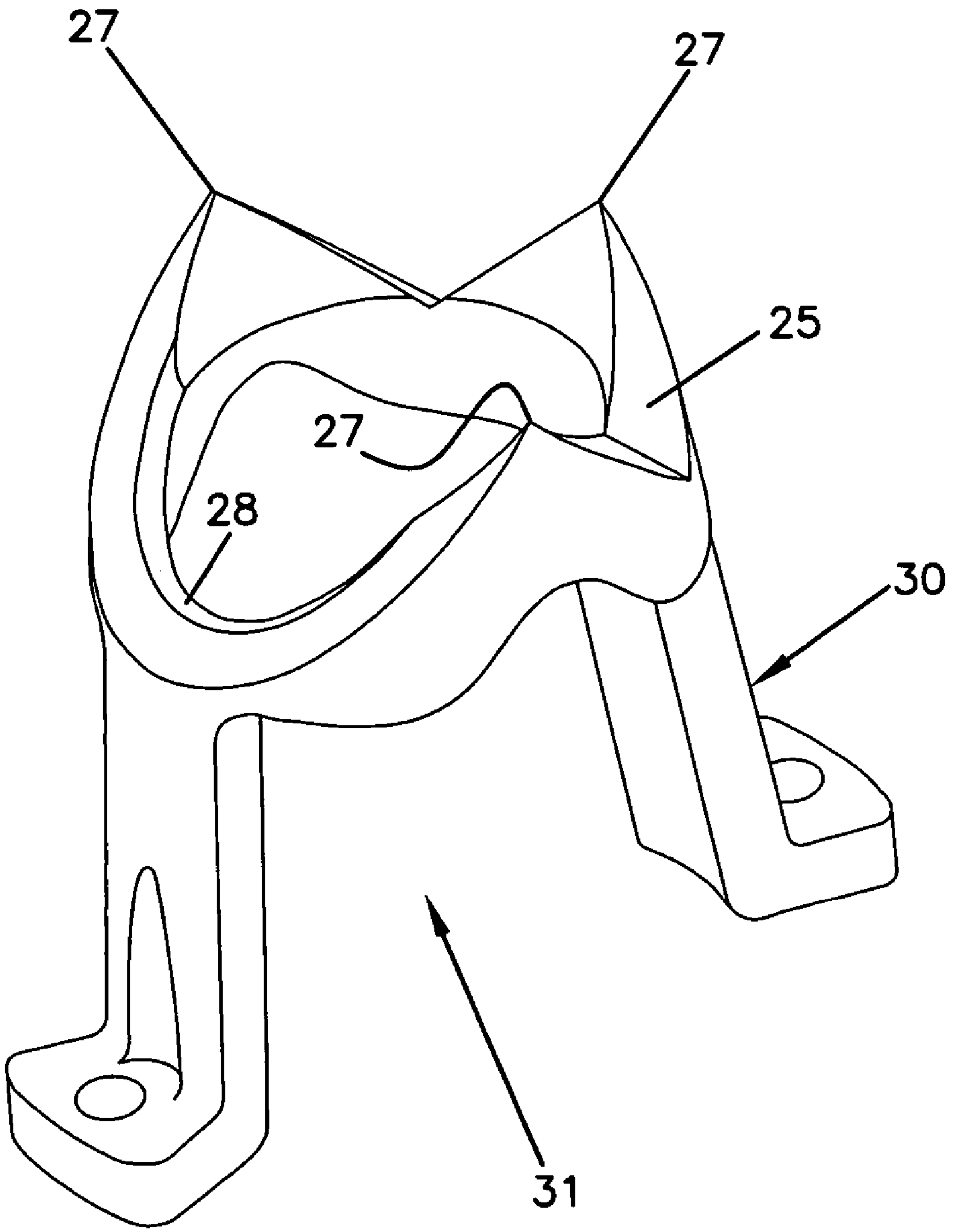

FIG. 4B schematically illustrates another embodiment of hollow contoured spike 25. This embodiment of hollow contoured spike 25 includes one or more (e.g., three) of hollow point 27, one or more of rounded edge 28, and one or more (e.g., 2) of spike leg 30, and defines cavity 31. Hollow point 27 is configured to contact and break the container seal. As shown in FIG. 4B, a plurality of hollow points 27 is asymmetrically arranged on hollow contoured spike 25. Rounded edge 28 can be configured to provide a portion of seal that remains attached to the container. Rounded edge 28 can be configured to move the seal to a position in which it does not block the opening of the container. In an embodiment, rounded edge 28 is configured above a spike leg 30. Although not limiting to the present invention, in an embodiment, rounded edge 28 positioned above spike leg 30 can allow spike leg 30 to be positioned adjacent to a cut out portion of the container seal. Cavity 31 in hollow contoured spike 25 can be configured to allow composition (including particles) to pass through and/or to house spout 3 or nozzle 15.

FIG. 1 also schematically illustrates receptacle 5 of the system. Receptacle 5 is configured to receive the container and to position it for piercing, emptying, and rinsing. Receptacle 5 includes sidewall 17 and bottom wall 19. Sidewall 17 can be configured to be complementary to the shape of all or a part of the container. For example, sidewall 17 generally describing a cylinder can complement a container with a generally cylindrical portion. In an embodiment, as the container enters receptacle 5, sidewall 17 orients the container opening toward spike 1 and spout 3. Bottom wall 19 can be configured and positioned to allow the container to enter receptacle 5 to a distance effective to open the container, push aside the container seal, and position spout 3 for effective rinsing of the container. Bottom wall 19 can stop the container from further entering the system. For example, receptacle 5 can position the container with spike 1 protruding into the container to about 25% of the depth of the container.

The embodiment schematically illustrated in FIG. 1 also includes optional receptacle sensor 21. Receptacle sensor 21 is configured to indicate the presence of a properly inserted container in receptacle 5. Receptacle sensor 21, typically in conjunction with processor 23, can be configured to prevent rinsing unless the receptacle contains a properly inserted container. Conversely, receptacle sensor 21, typically in conjunction with processor 23, can activate rinsing.

FIG. 1 schematically illustrates spout 3 near the opening of the container, but positioned so that it does not extend into the container on receptacle 5. In an embodiment, spout 3 (e.g., nozzle 15) can direct fluid (e.g., water) onto a seal of a container. The seal of the container can be positioned in receptacle 5 with the seal above spout 3. In such an embodiment, fluid from spout 3 can dissolve or fragment the seal and open the container.

Figure 5B:
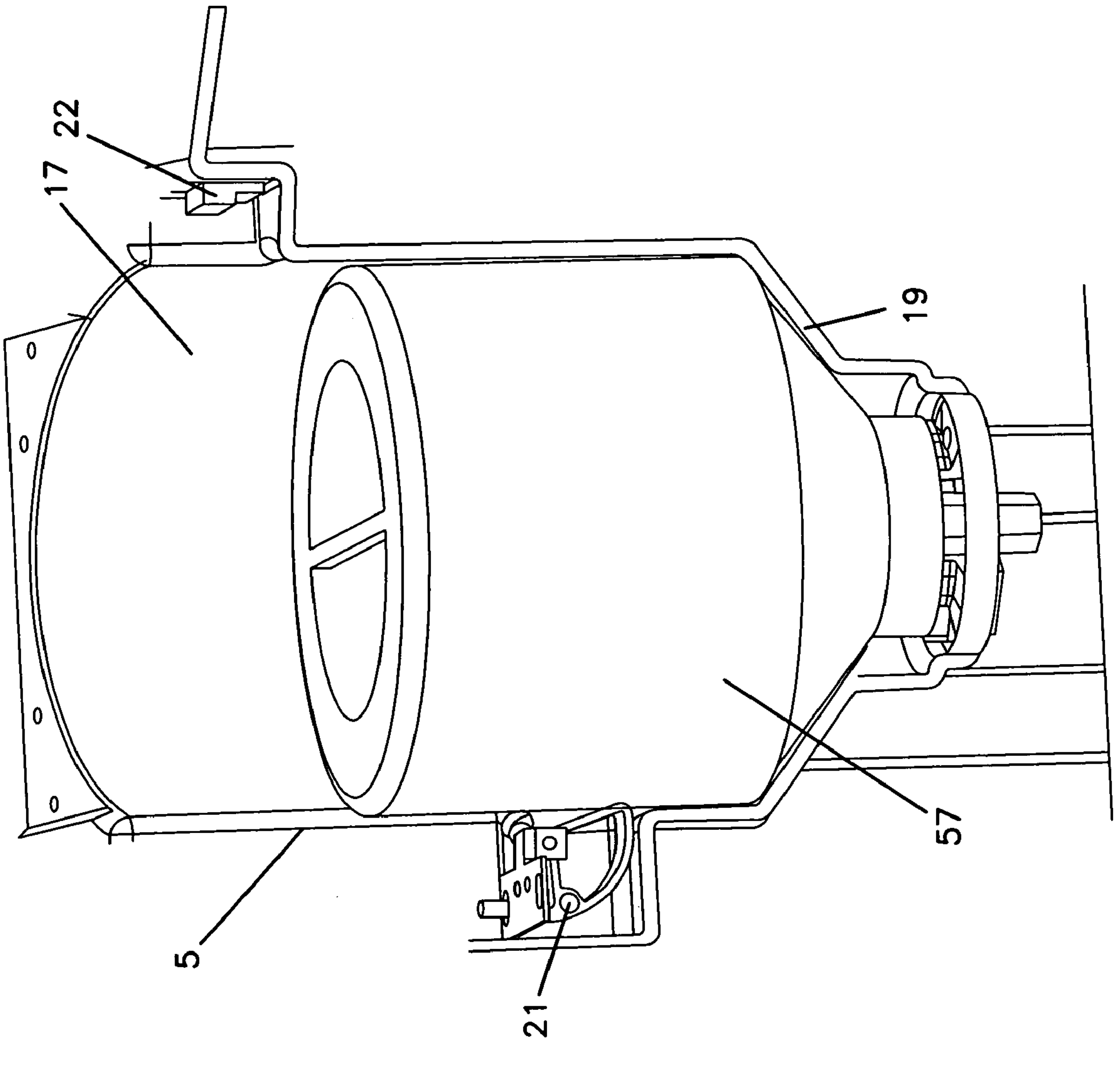

FIGS. 5A and 5B schematically illustrate an embodiment of the present apparatus including a breach system. These Figures illustrate an embodiment of hollow contoured spike 25 that is dimensioned to occupy half or more (e.g., about 85%) of the cross sectional area of the opening of the container. Cavity 31 in hollow contoured spike 25 is configured to allow the composition to flow through and into the tank and to house nozzle 15. In an embodiment, the hollow contoured spike 25 is dimensioned to prevent the seal from blocking the nozzle 15 spray pattern. FIG. 5A illustrates spout 3 in the form of nozzle 15.

FIG. 5A schematically illustrates container 57 partway into receptacle 5 and above hollow contoured spike 25 and nozzle 15. Receptacle sensor 21 has not been actuated. In FIG. 5B, container 57 has been urged onto hollow contoured spike 25, and most of hollow contoured spike 25 is within container 57. Receptacle sensor 21 has been actuated.

The embodiment schematically illustrated in FIGS. 5A and 5B also includes a lid sensor 22. Lid sensor 22 is configured to indicate that the lid 13 (see, e.g., FIG. 9) is closed. Lid sensor 22 can be configured to prevent rinsing unless lid 13 is closed, for example, through signals to and from processor 23.

FIG. 1 schematically illustrates an embodiment of the present apparatus including a dilution system. In this embodiment, the dilution system includes basin 33, mixer 35, and optional tap 37. Basin 33 is configured to receive composition and rinse from the container and the breach system. For example, basin 33 can be positioned under spike 1, spout 3, and receptacle 5 (FIG. 1). Basin 33 has a volume large enough to contain the composition, the rinse fluid, and optional fluid from tap 37, which are used to dilute the composition to the intermediate composition.

Figure 8:
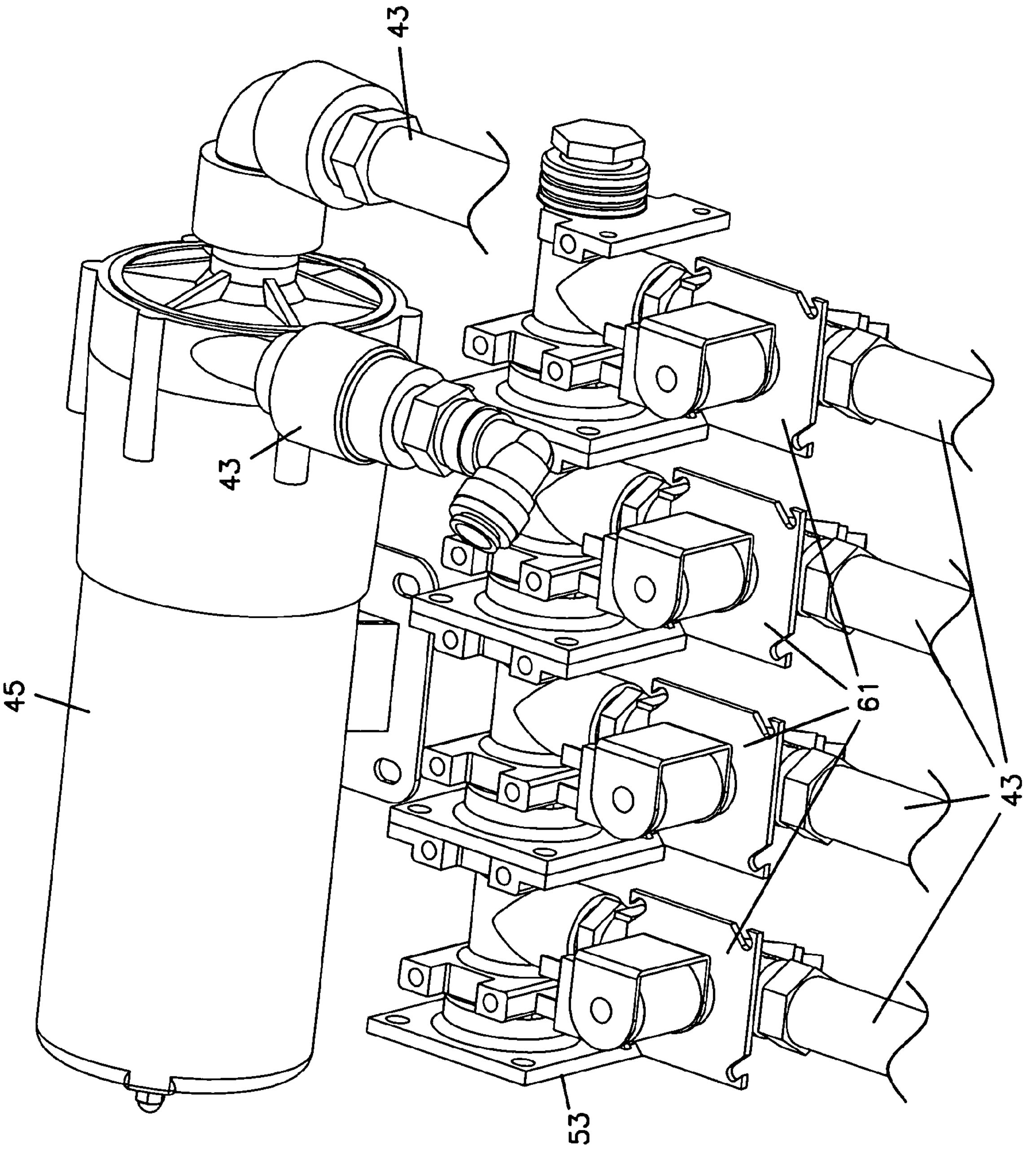
FIG. 8 schematically illustrates an embodiment of a pump and a manifold according to the present invention.
Figure 9:
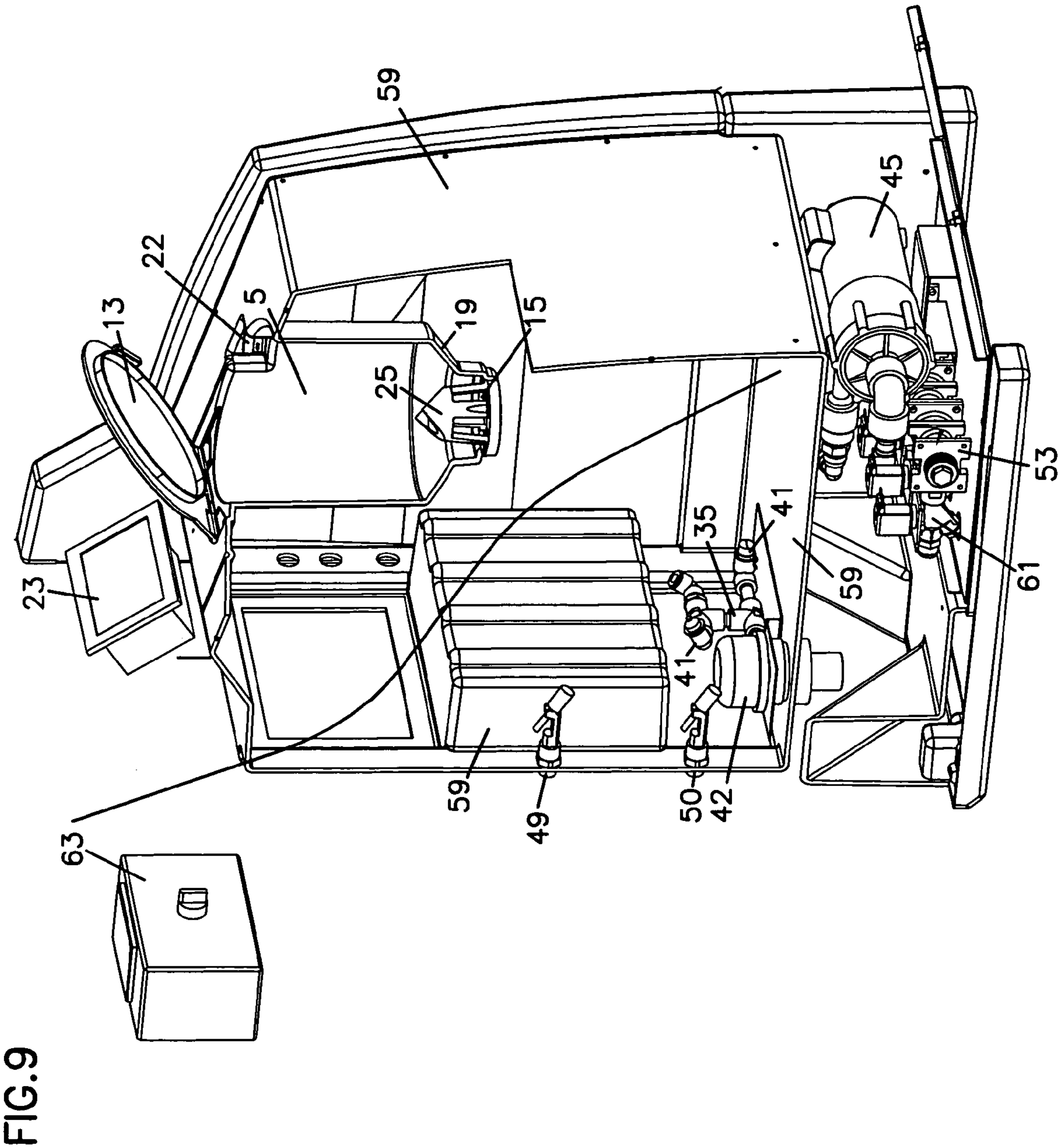
FIG. 9 schematically illustrates an embodiment of the present apparatus that includes certain features schematically illustrated in FIGS. 4A, 4B, 5A, 5B, 6, and 8.

Mixer 35 is configured to combine the composition, rinse, and optional additional fluid in the tank to produce the intermediate composition. Mixer 35 can include a motor driven impeller (not shown). Mixer 35 can also include one or more jets 41 (FIG. 6) in fluid communication (e.g., through one or more tubes 43) with pump 45 (FIG. 1). Pump 45 can draw fluid from the bottom of the tank through inlet strainer 42, into pump 45, out through control valve 61, through tube 43, then back into the tank through one or more jets 41 (FIGS. 7-9).

In an embodiment, all fluid employed in basin 33 is dispensed by spout 3, typically by way of the container. That is, spout 3 provides the diluting fluid (e.g., service water, such as soft water or tap water) to dilution system. Spout 3 can be under the control of processor 23. Spout 3 can be controlled to provide a predetermined level or volume of water to the tank. In an embodiment, high level sensor 49 can indicate that the desired level or volume of water has been added to basin 33.

This indication by high level sensor 49 can stop flow through spout, for example, employing processor 23 and spout valve 4.

Figure 7A:
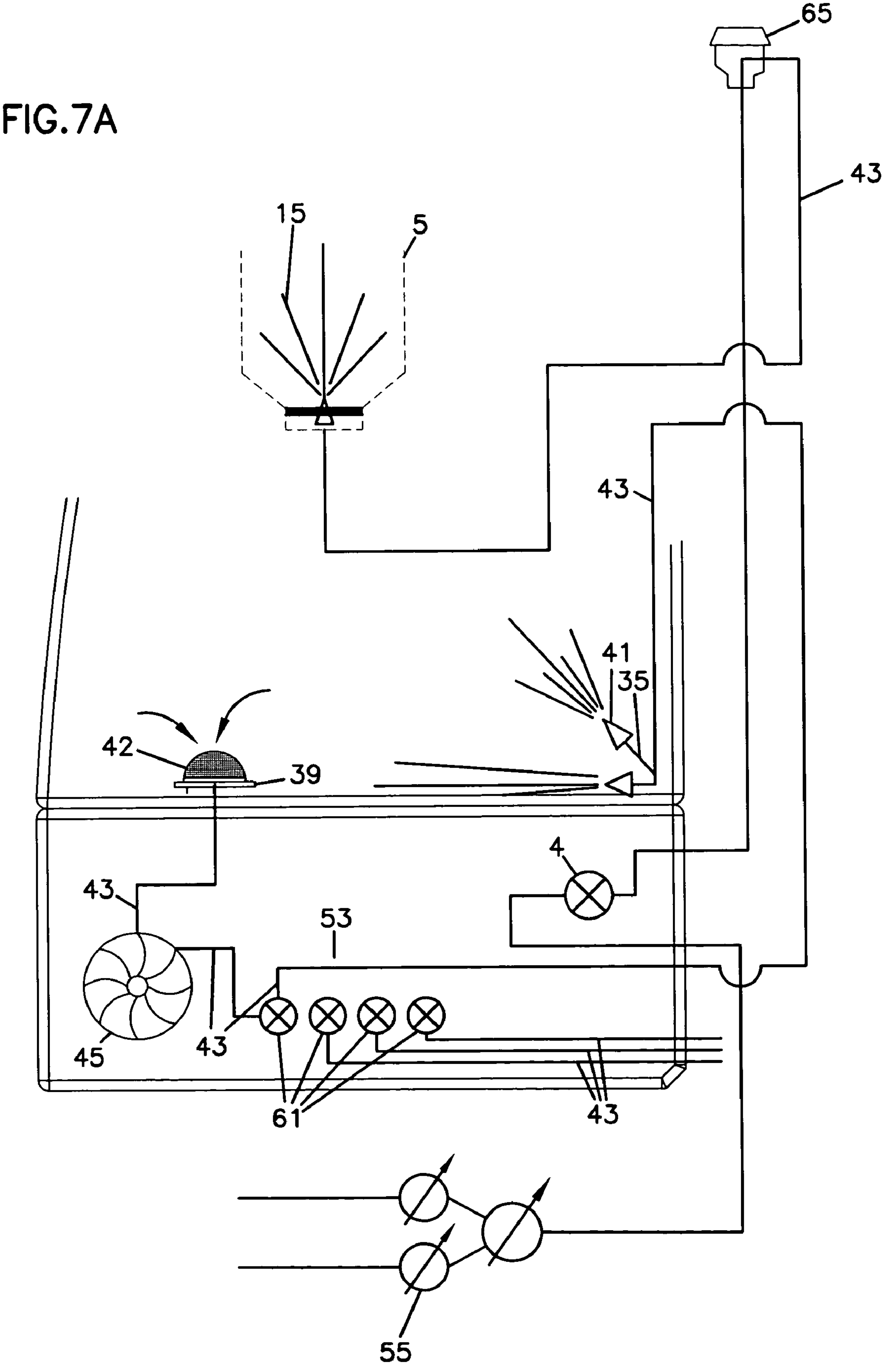
FIGS. 7A and 7B schematically illustrate embodiments of certain fluid handling portions of the present apparatus.
Figure 7B:
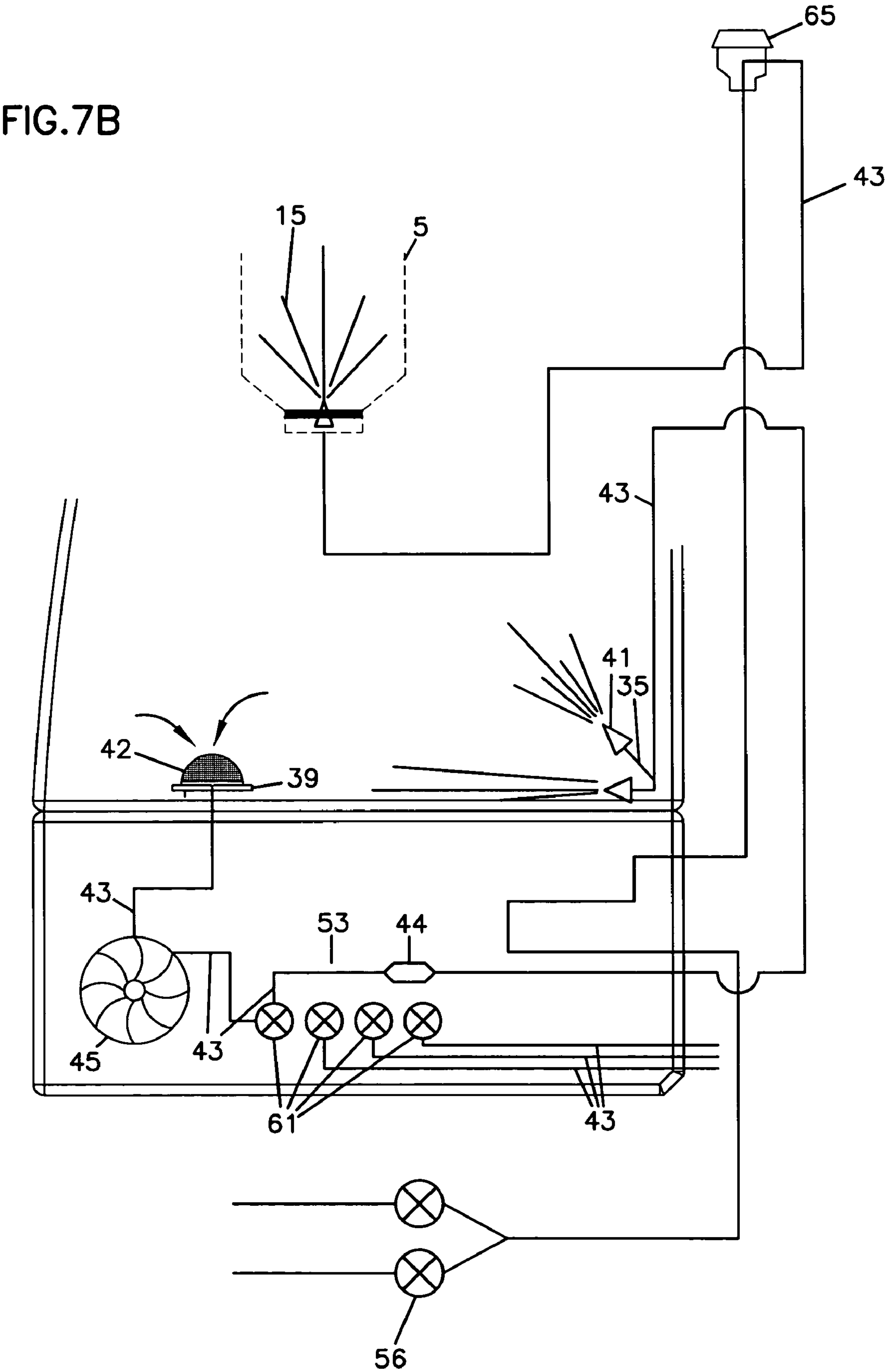

FIGS. 7A and 7B schematically illustrate embodiments of the present apparatus with emphasis on portions of the apparatus involved in fluid handling. For example, FIGS. 7A and 7B schematically illustrate a rinsing system, a dilution system, and a distribution system. In these illustrated embodiments, all fluid employed in basin 33 is dispensed by nozzle 15. In the embodiment illustrated in FIG. 7A, hot and cold service water (or other fluid) enter the apparatus through tempering valve system 55, which can control the temperature of the water (or other fluid) passing into the apparatus. In the embodiment illustrated in FIG. 7B, hot and cold service water (or other fluid) enter the apparatus through controlled valve system 56, which can control the temperature of the water (or other fluid) passing into the apparatus. For example, processor 23 can increase or decrease the feed time of one or both of hot and cold water through controlled valve system 56 to set the temperature of water entering the apparatus. The temperature controlled fluid can then pass through optional spout valve 4 and a vacuum breaker 65. Vacuum breaker 65 can prevent or minimize flow of fluid from the apparatus back into the fluid supply.

Figure 1B:
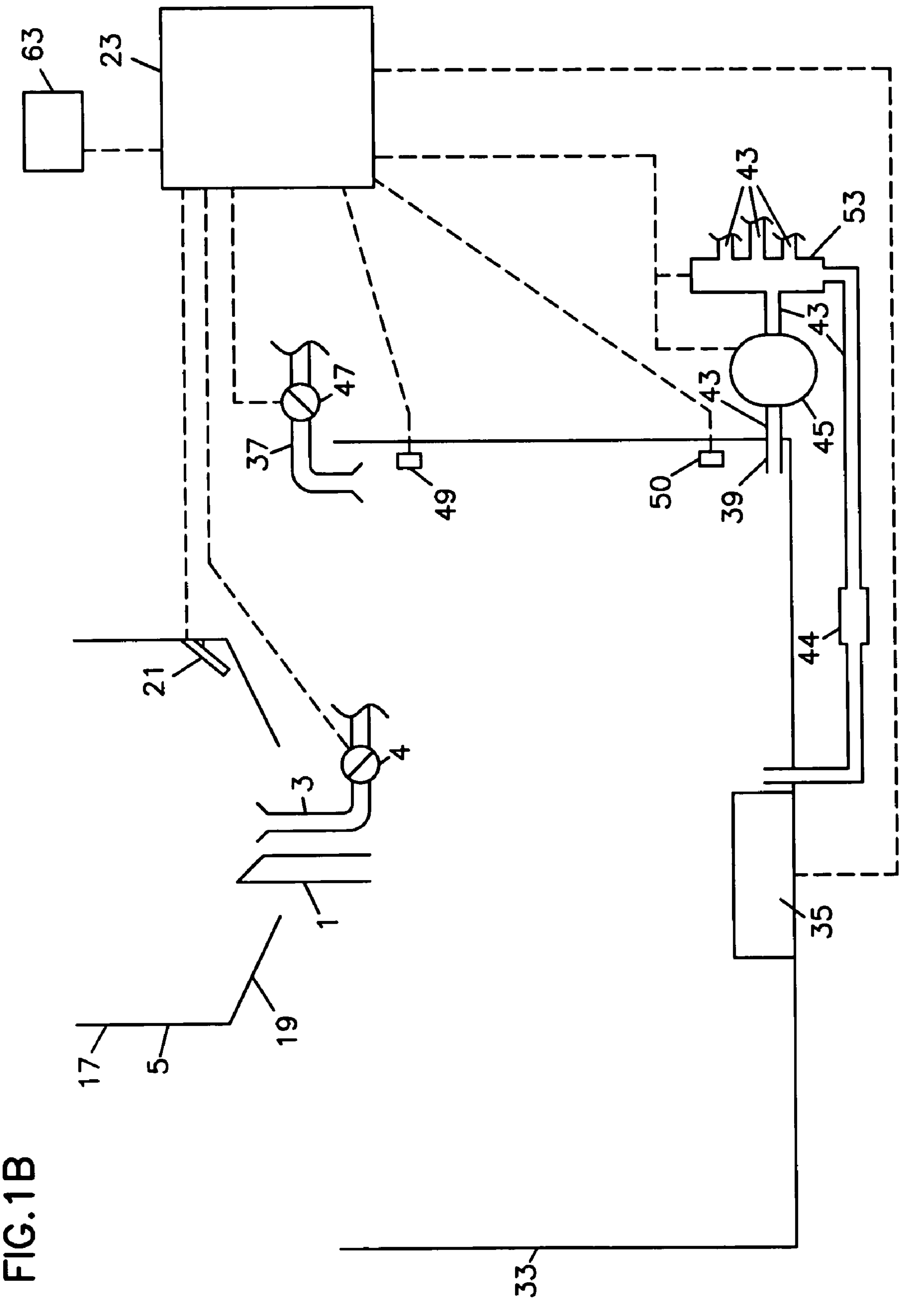

In these illustrated embodiments (FIGS. 7A and 7B), fluid is dispensed into the apparatus through nozzle 15, which is configured to spray into container 57 (not shown). Fluid then enters basin 33. Fluid from basin 33 can be brought into pump 45 and manifold 53 through pump inlet 39 and optional pump inlet strainer 42. Manifold 53 can recirculate fluid to basin 33, for example, through mixer 35 with jets 41. In an embodiment, the circulating fluid can pass through filter 44 (FIGS. 1B and 7B).

Returning to FIG. 1, in an embodiment, the system can include optional tap 37, which is configured to provide fluid communication of additional diluting fluid into the dilution system. Tap 37 can include a tap valve 47 that can regulate whether or not diluting fluid is flowing and the amount of flow. Tap valve 47 can be under the control of processor 23. Tap valve 47 can be controlled to provide a predetermined level or volume of water to the tank. In an embodiment, high level sensor 49 can indicate that the desired level or volume of water has been added to basin 33. This indication by high level sensor 49 can stop flow, for example, by employing processor 23 and tap valve 47.

FIG. 1 schematically illustrates an embodiment of the present apparatus including a distribution system. In this embodiment, the distribution system includes pump 45, one or more tubes 43, a manifold 53, processor 23, and optional washer interface module 63. Pump 45 and processor 23 can cooperate to send fluid through tube(s) 43, and manifold 53 at predetermined or desired times and amounts. One or more tubes 43 provide fluid communication between basin 33, pump 45, manifold 53, and the site at which the intermediate composition will be used for, for example, cleaning. Manifold 53 is configured, together with certain tubes 43, to direct intermediate composition to no, one, some, or all of the sites of use. Processor 23 can control the time, duration, or quality of activity of pump 45 and/or manifold 53. Washer interface module 63 can signal processor 23 with requests from the cleaning apparatus, for example, to start or stop flow of intermediate compositions.

In an embodiment, the apparatus can include optional low level sensor 50. Low level sensor 50 can detect and/or indicate that the level of fluid in basin 33 is sufficiently low that more intermediate composition should be made and/or that the distribution system should not distribute more fluid from basin 33. For example, low level sensor 50 can stop flow through tubes 43 employing processor 23 and manifold 53.

Figure 6:
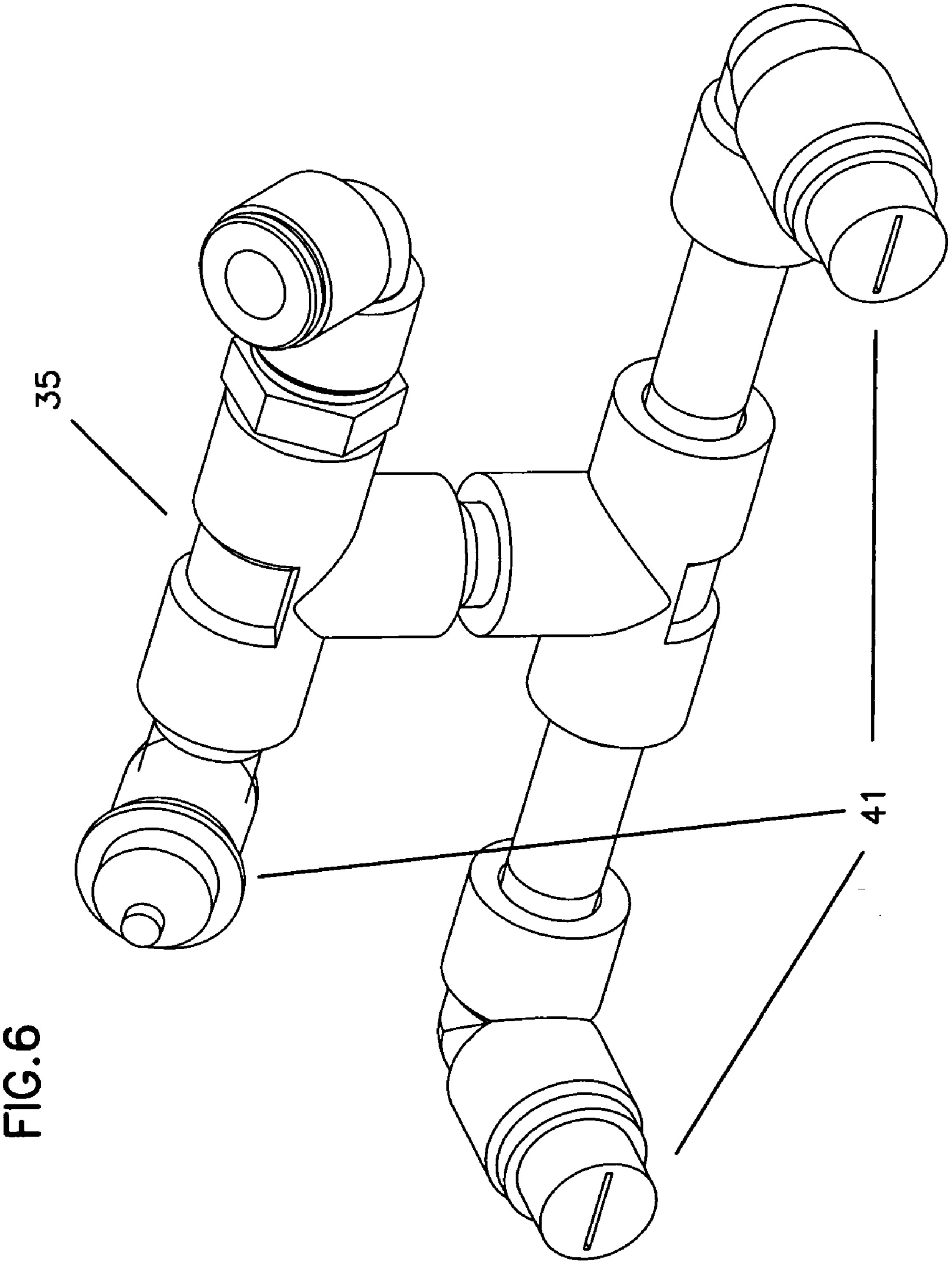
FIG. 6 schematically illustrates an embodiment of a mixer according to the present invention including jets.

In an embodiment, pump 45, manifold 53, and processor 23 can cooperate to circulate fluid within basin 33. Such an embodiment can employ a mixer including jets 41 and tubes 43, for example, as illustrated in FIGS. 6 and 7. In an embodiment, the present apparatus includes one pump 45. Pump 45 can be, for example, a centrifugal pump, an oscillating pump, a gear pump, or an air diaphragm pump.

FIG. 8 schematically illustrates an embodiment of pump 45 and manifold 53. In this embodiment, manifold 53 includes manifold control valves 61. Manifold 53 can include, for example, three manifold control valves 61 that regulate flow of fluid to three sites of use and a fourth manifold control valve 61 that regulates circulation of fluid within basin 33. In an embodiment, manifold control valve 61 is a solenoid valve. In this Figure, fluid flows into and from pump 45 and manifold 53 through tubes 43.

FIG. 9 schematically illustrates an embodiment of the present apparatus including a breach system, a dilution system, and a distribution system. This illustrated embodiment includes certain features also illustrated in FIGS. 4, 5A, 5B, 6, and 8. In addition, the apparatus can include one or more features illustrated only in this Figure. For example, this Figure schematically illustrates lid 13 and washer interface module 63. Washer interface module 63 is an embodiment of the cleaning apparatus interface system. Washer interface module 63 is configured to transmit washer request signals to the processor 23.

In this embodiment, the breach system includes hollow contoured spike 25, nozzle 15, and receptacle 5. As illustrated, this embodiment also includes lid 13 positioned and configured to close over receptacle 5. Lid 13 can close and actuate lid sensor 22. Lid sensor, in conjunction with processor 23, can be configured to allow rinsing or other operation of the apparatus only when lid 13 is closed over receptacle 5.

In this embodiment, the dilution system includes basin 33 and mixer 35. Basin 33 is shown positioned under hollow contoured spike 25, nozzle 15, and receptacle 5. Basin 33 is defined or formed by walls 59, which form a fluid tight basin 33. This Figure shows a cutaway view of basin 33. Mixer 35 includes several jets 41. According to this embodiment, mixer 35 is in fluid communication with pump inlet strainer 42 and the distribution system. All fluid in basin 33 comes from nozzle 15.

In this embodiment, the distribution system includes pump 45, a manifold 53, processor 23, washer interface module 63, and one or more tubes 43 (not shown). Pump 45, processor 23, and washer interface module 63 can cooperate to send fluid through tube(s) 43 (not shown), and manifold 53 at predetermined or desired times and amounts. This fluid can be sent outside the present apparatus also. Pump 45, manifold 53, processor 23, and mixer 35 can cooperate to circulate fluid in basin 33.

Figure 10:
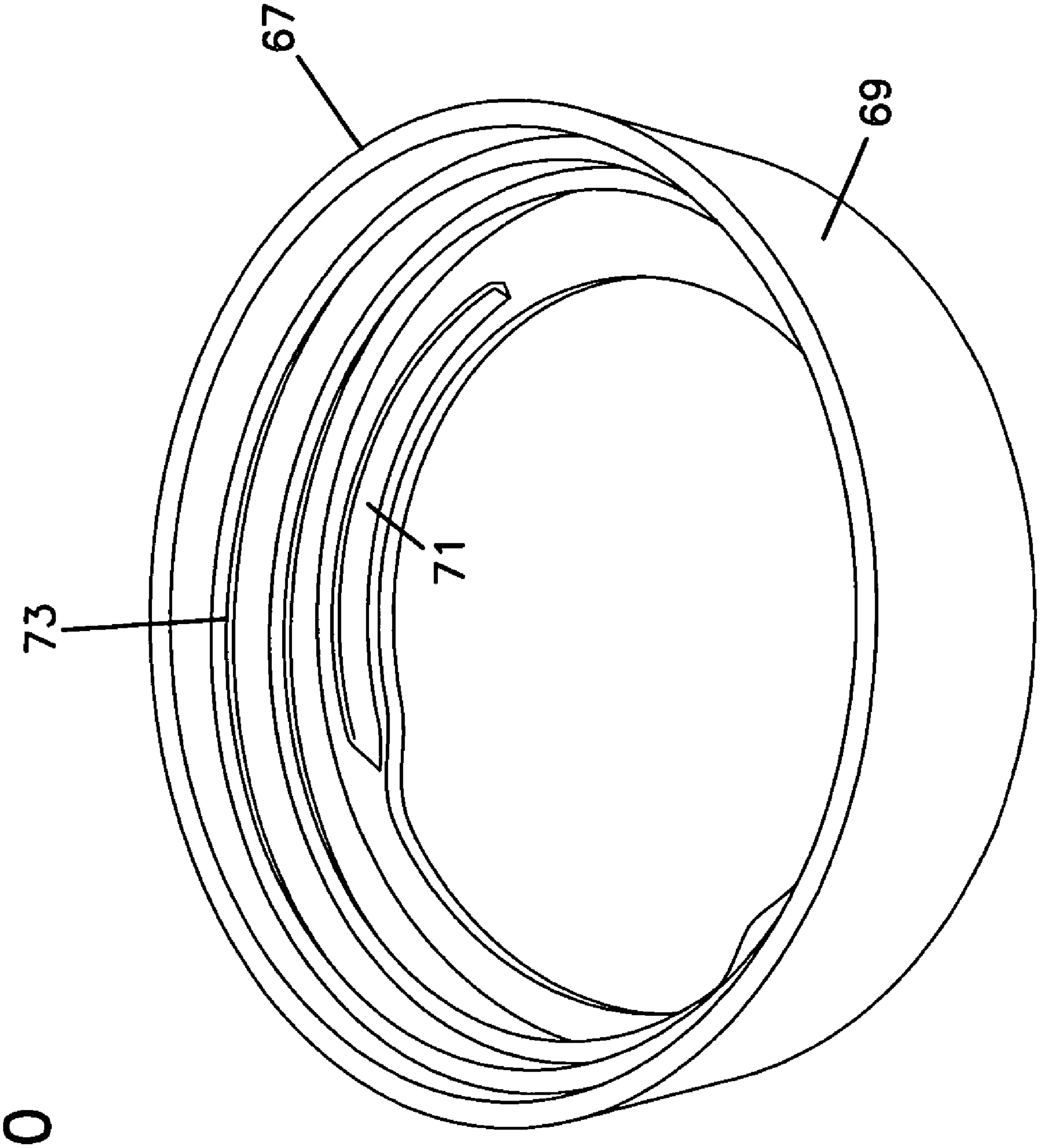
FIG. 10 schematically illustrates an embodiment of the threaded cutter according to the present invention.

FIG. 10 schematically illustrates an embodiment of the rotational slicing system. In this embodiment, the rotational cutting system takes the form of threaded cutter 67. Threaded cutter 67 includes threaded cylinder 69 and cutter 71. Threaded cylinder 69 can include threads 73. Threaded cutter 67 can be configured to reversibly couple with the container. Threaded cylinder 69 can direct a seal on the container onto cutter 71 employing rotation of the container and threads 73. Cutter 71 and threaded cylinder 69 can be configured to provide less than 360° (e.g., 270°) of rotation of the container after the container seal contacts cutter 71. Cutter 71 and threaded cylinder 69 can be configured to make a cut of less than 360° (e.g., 270° or less) in the container seal.

It should be noted that, as used in this specification and the appended claims, the singular forms "a," "an," and "the" include plural referents unless the content clearly dictates otherwise. Thus, for example, reference to an apparatus containing "a jet" includes an apparatus with two or more jets. It should also be noted that the term "or" is generally employed in its sense including "and/or" unless the content clearly dictates otherwise.

It should also be noted that, as used in this specification and the appended claims, the term "configured" describes a system, apparatus, or other structure that is constructed or configured to perform a particular task or adopt a particular configuration. The term "configured" can be used interchangeably with other similar phrases such as arranged, adapted and configured, constructed and arranged, constructed, manufactured and arranged, and the like.

The invention has been described with reference to various specific and preferred embodiments and techniques. However, it should be understood that many variations and modifications may be made while remaining within the spirit and scope of the invention.

We claim:

1. A dispensing apparatus comprising:

a breach system;

a dilution system; and a distribution system;

the breach system being configured to open a container and release a composition from the container and into the dilution system;

the breach system comprising a rinsing system and a hollow contoured spike;

the rinsing system being configured to contact the container and composition remaining in the container with a fluid and remove additional composition from the container;

the hollow contoured spike:

comprising beveled surfaces, a spike leg, and a plurality of points, the points being asymmetrically arranged on the hollow contoured spike;

being configured to break and push aside a seal from the container opening; and defining a cavity;

the cavity being configured to allow the composition to pass through the hollow contoured spike and to house at least a portion of the rinsing system;

the dilution system being configured to receive the composition and to mix the composition with the liquid;

the distribution system being configured to transport the mixture of composition and liquid from the apparatus.

2. The apparatus of claim 1, the breach system further comprising:

a docking system configured to receive and dock the container of the composition; and a container sensor configured to indicate that the container is positioned for receiving fluid from the rinsing system.

3. The apparatus of claim 2, the rinsing system being configured to rinse composition from the container and into the dilution system in less than about 10 minutes.

4. The apparatus of claim 2, the rinsing system being configured to rinse composition from the container and into the dilution system employing less than about 9 times the volume of the container of liquid.

5. The system of claim 2, the docking system comprising a shape complementary to the container and configured to allow the container to enter the docking system to a distance effective to open the container, push aside the container seal, and position the rinsing system for effective rinsing of the container.

6. The apparatus of claim 1, the breach system being located over the dilution system.

7. The apparatus of claim 1, the dilution system comprising:

a tank configured to receive the composition and rinse from the container and breach system and comprising a volume sufficient to contain the composition and rinse;

a mixing system configured to combine the composition and rinse in the tank; and a diluent sensor configured to indicate when fluid in the tank reaches a predetermined level or volume.

8. The apparatus of claim 7, the mixing system comprising one or more jets.

9. The apparatus of claim 7, wherein the volume of fluid added is determined by the level of the fluid in the tank at the start of the addition cycle.

10. The apparatus of claim 1, the distribution system comprising:

a fluid moving system, one or more fluid conducting systems, each configured to provide fluid communication;

a fluid distributing system, and a controller;

the fluid moving system being configured to move fluid through the fluid conducting system and fluid distributing system at times and in amounts indicated by the controller;

the fluid distributing system being configured to direct fluid to the one or more fluid conducting systems at times and in amounts indicated by the controller the controller being configured to direct the fluid moving system and fluid distributing system.

11. The apparatus of claim 10, the fluid distributing system comprising a manifold, the manifold being configured to direct fluid to one or more sites of use.

12. The apparatus of claim 10, the manifold comprising a manifold control valve.

13. The apparatus of claim 10, wherein the fluid moving system, fluid distributing system, and controller cooperate to circulate fluid within the dilution system.

14. The apparatus of claim 1, wherein the hollow contoured spike is configured to break a seal, push the broken seal into the interior of the container, and maintain a portion of the seal attached to the container.

15. The apparatus of claim 1, wherein the hollow contoured spike is dimensioned to occupy half or more of the cross sectional area of the container opening.

16. The apparatus of claim 1, wherein the hollow contoured spike comprises three points and three beveled surfaces;

the beveled surfaces being between the points and defining an entry to the cavity;

the points being configured to contact and break the container seal;

the beveled surfaces being configured to move the container seal into a position in which it does not block the container opening.

17. A method of dispensing a heterogeneous cleaning composition comprising:

piercing and pushing aside a covering on an opening of a container with a hollow contoured spike and rinsing the container;

thereby transferring the contents of the container into a dilution system;

combining the contents with a fluid to produce an intermediate composition; and dispensing the intermediate composition to a washing machine;

wherein the hollow contoured spike:

comprises beveled surfaces, a spike leg, and a plurality of points, the points being asymmetrically arranged on the hollow contoured spike;

is configured to break and push aside seal from container opening; and defines a cavity;

the cavity being configured to allow the composition to pass through the hollow contoured spike and to house at least a portion of a rinsing system.

18. A dispensing apparatus comprising:

a breach system;

a dilution system;

a distribution system; and a controlled valve system;

the breach system being configured to open a container and release a composition from the container and into the dilution system;

the breach system comprising a rinsing system and a hollow contoured spike;

the rinsing system being configured to contact the container and composition remaining in the container with a fluid and remove additional composition from the container;

the hollow contoured spike:

comprising a point, beveled surfaces, and a spike leg;

being configured to break and push aside a seal from the container opening; and defining a cavity;

the cavity being configured to allow the composition to pass through the hollow contoured spike and to house at least a portion of the rinsing system;

the dilution system being configured to receive the composition and to mix the composition with the liquid;

the distribution system being configured to transport the mixture of composition and liquid from the apparatus;

the controlled valve system being configured to control the temperature of water entering the dispensing apparatus.

* * * * *